June 7, 1960 V. F. RAQUE 2,940,026
VARIABLE BANDWIDTH SERVOMECHANISM
Filed June 18, 1957
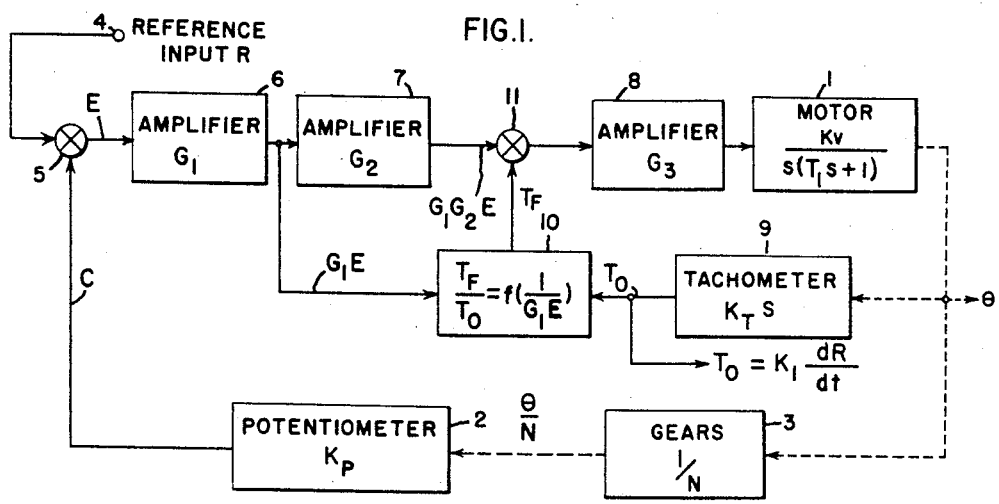
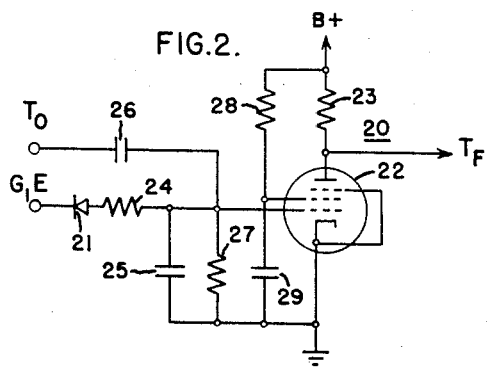
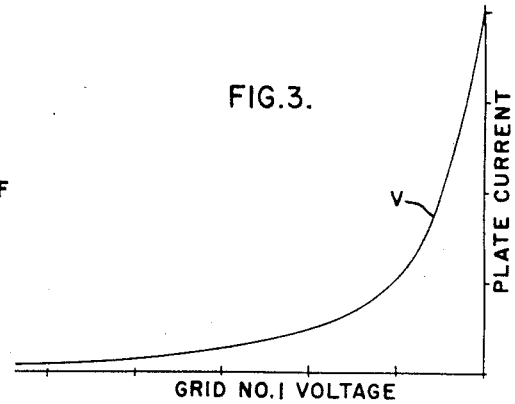
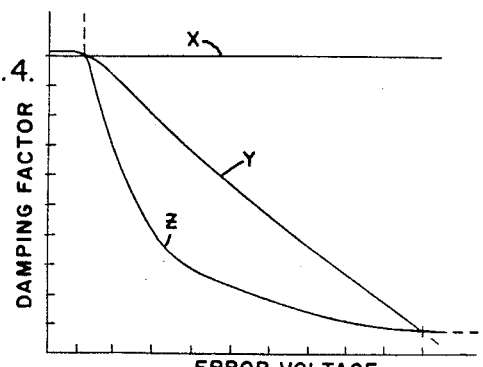
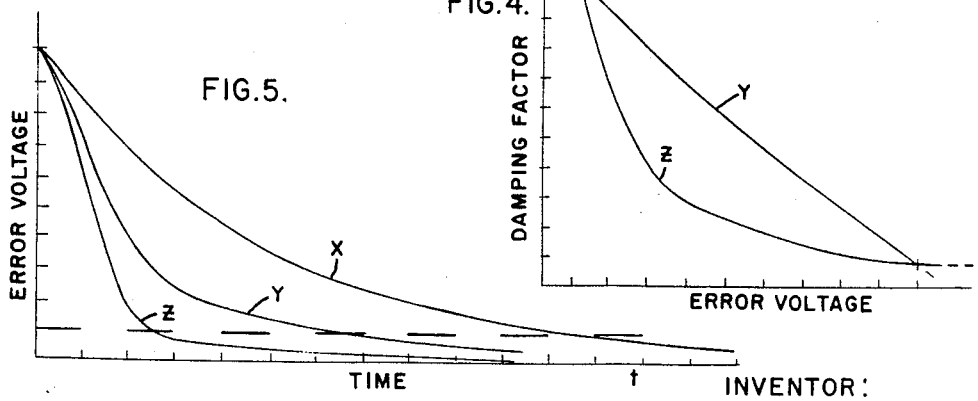
INVENTOR:
VERNON F. RAQUE,
BY Donald C. Keaveney
HIS ATTORNEY.

United States Patent Office 2,940,026
Patented June 7, 1960

2,940,026

VARIABLE BANDWITH SERVOMECHANISM

Vernon F. Raque, North Syracuse, N.Y., assignor to General Electric Company, a corporation of New York Filed June 18, 1957, Ser. No. 666,382

2 Claims. (Cl. 318—18)

This invention relates to servomechanism systems. More particularly this invention relates to circuitry and apparatus for variably controlling the bandwidth of a rate damped servomechanism in such a manner as to improve the transient or time response thereof.

Servomechanism systems are widely used in many types of apparatus and are described, for example, in a work entitled "Servomechanisms and Regulating System Design," by Chestnut and Mayer, published by John Wiley and Sons, New York, 1951. Reference is made to volumes I and II of this work for standard definitions of the terminology used in this specification.

Rate damped servo systems as defined therein are commonly used in many control and computer equipments. In gun fire control systems, for example, a radar system may have as its output a voltage representing the instantaneous position coordinate of a target to be tracked. This voltage may be applied as a reference input signal to a servomechanism loop provided with means for deriving both a controlled variable signal corresponding to the reference input signal and a signal representing the rate of change of the controlled variable of the system. The controlled variable may, for example, be the shaft rotational position of a motor which in turn positions a potentiometer for any desired computing or control purpose. In such a system a tachometer can, for example, be used to derive or measure the rate of change of the controlled variable. Of course, if the controlled variable represents target position, its rate of change represents target velocity.

It has been common practice in such systems to apply a portion of the rate or velocity signal as negative feedback within the system to damp the system and thereby limit its bandwidth. This bandwidth limitation is normally designed into the system in order to render it more stable and to cause it to reject spurious noise in the input signal which might otherwise cause large errors. When the bandwidth is so limited, however, the transient response of the system or the time required for stable accurate response to a changing input signal such as a step function input, is also necessarily limited by virtue of the limited bandwidth. Ideally, the bandwidth should be infinite for a large error signal and rapidly become extremely small when the servo system has reduced the error signal to a preestablished tolerance level.

It is therefore an object of this invention to provide an improved means for varying the bandwidth of a rate damped servomechanism so as to improve the transient or time response of the system.

It is a further object of this invention to provide a novel signal processing arrangement.

It is a more specific object of this invention to provide circuitry and apparatus for varying the amount of negative rate feedback in a rate damped servo system as a function of the reciprocal of the absolute magnitude of the error signal existing in the system.

Briefly, in accordance with one aspect of this invention, the rate signal in the servo system is applied as an input signal to the grid of a remote cut off pentode amplifier the gain of which is approximately a reciprocal function of its bias. The bias for this amplifier is derived by applying the error signal in the system to the grid of the amplifier through a diode. The output of the pentode amplifier is then applied as negative feedback by subtracting it from the error signal and using the resulting difference signal as an input to the motor or other element of the system used to derive the controlled variable signal.

While the novel and distinctive features of the invention are particularly pointed out in the appended claims, a more expository treatment of the invention in principle and in detail, together with additional objects and advantages thereof, is afforded by the following description and accompanying drawings in which:

Fig. 1 is a block diagram of a rate damped servomechanism incorporating the improvement of the present invention.

Fig. 2 is a schematic circuit diagram of a remote cut-off amplifier used in the feedback circuit of the system of Fig. 1.

Fig. 3 is a graph of the control grid voltage plotted as abscissa against the plate current as ordinate for the pentode amplifier tube in the circuit of Fig. 2.

Fig. 4 is a graph showing the system error voltage plotted as abscissa against the system damping factor as ordinate for two prior art types of system as compared to the system of Fig. 1.

Fig. 5 is a graph showing system error voltage plotted as ordinate against time as abscissa for the same three cases illustrated in Fig. 4.

Turning now to the drawings, and in particular to Fig. 1 thereof, there is shown by way of example only a block diagram of an illustrative embodiment of a servomechanism of the type commonly designated as a rate damped Type 1 system. By way of example only, this is shown in Fig. 1 as an electromechanical A.-C. system of the type commonly used in fire control apparatus. The system comprises a motor 1 the shaft of which drives a linear potentiometer 2 through reducing gears 3. The angular position, $\theta$, of the shaft of motor 1 may be measured from any convenient reference or zero position of the shaft and thus affords a mechanical representation of the controlled variable or output signal of the system. Reducing gears 3 have a gear ratio of N. Hence the transfer function of block 3, that is to say, the ratio of the output of the block to the input of the block, is $1/N$ as shown by the legend in Fig. 1. From the definition of the transfer function and from the fact that $\theta$ is applied as an input to block 3, it follows that the output of block 3 is equal to $\theta/N$. This output is applied to mechanically drive the wiper arm of potentiometer 2.

In the particular exemplary system being discussed herein potentiometer 2 has an alternating current or A.-C. voltage of fixed magnitude applied between its two ends, the output voltage C being taken from the wiper arm. If the system were designed for a D.-C. input reference signal, the voltage applied to potentiometer 2 would, of course, also be D.-C. Since potentiometer 2 is linear, its transfer function is simply a constant of proportionality designated in Fig. 1 as $K_p$. Furthermore, in view of the linearity of both potentiometer 2 and gears 3, the electrical output signal C of potentiometer 2 will have a magnitude directly proportional to the magnitude of $\theta$ and is thus an electrical representation of the controlled variable of the system.

An externally derived reference input signal or voltage R is applied via terminal 4 to a subtracting circuit 5 which has the controlled variable signal C as its other input. The output of subtracting circuit 5 is an error signal E which is equal to R-C. This error signal is amplified and processed as by amplifiers 6, 7, and 8 having gains $G_1$, $G_2$ and $G_3$ respectively, and, after being combined with a feedback damping signal derived through blocks 9, 10, and 11, is applied as an electrical input to drive motor 1. It is apparent that when the controlled variable signal C is exactly equal to the reference input signal R the error signal E will be equal to zero. Since no power is then applied to motor 1 the shaft position $\theta$ will remain constant until some change occurs in the magnitude of the input reference signal R. When such a change occurs error signal E is no longer zero and power is applied to motor 1 in such a manner as to cause its shaft to rotate in a direction such that the controlled variable signal C will again become equal to reference input signal R—that is to say, in a direction tending to reduce the error signal E to zero.

In an ideal or perfect servomechanism this action would occur instantaneously and error signal E would always be exactly zero no matter how rapidly the reference input signal R changed. Furthermore, in the steady state existing after the transient has passed a perfect system would reject or not respond to extraneous noise in the input reference signal. That is to say, the system would simultaneously have a perfect transient response, and be insensitive to high frequency noise. In practice the two desired characteristics are contradictory to the extent that measures taken to improve the transient response tend also to increase the sensitivity of the system to noise and measures taken to reject noise tend also to reduce the transient response time.

The first of these desired characteristics, response time, is related to the inertia associated with the various components of the system. This relationship is expressed mathematically by the transfer function $K_v/s$ $(T_1s+1)$ of motor 1. In this expression each of the symbols has the meaning ascribed to it in the above noted book by Chestnut and Mayer. That is to say, $K_v$ is the velocity constant of the motor, $s$ is a mathematical symbol commonly known as Laplacian operator, and $T_1$ is the mechanical time constant of the motor.

Another way of looking at this matter is to note that in the steady state of the system, that is to say, when the reference input signal R is a constant, error signal E will eventually be reduced to zero and controlled variable $\theta$ or C will then remain at a corresponding constant value. If now a transient change occurs in the magnitude of R, this variable portion of the reference input signal can be broken down by the well known techniques of (Fourier) analysis into its various frequency components. The servomechanism, however, will respond most readily to the lower frequency components. The range of frequencies from zero up to that frequency at which the response becomes 0.707 of the response at zero frequency may be termed the bandwidth of the system. If the bandwidth of the system were infinite so that the system could respond to all frequencies, the controlled variable C would instantaneously follow even the most rapid change in R. Such a system, of course, can not be realized in practice. Nonetheless it is true in practice that one does attempt to achieve a reasonably large bandwidth in order to improve the response time of the system to rapid changes in the input reference signal. It has been common practice to increase the bandwidth by decreasing the damping.

If one does this, however, the increase in bandwidth will also render the system more responsive to noise in the input reference signal since most of the noise is composed of relatively high frequency components. From the point of view of eliminating noise it would be desirable to have a very narrow bandwidth, that is, large damping. From the point of view of rapid response to large error signals it would be desirable to have a wide or large bandwidth, that is, small damping. Hence the desirability of a variably damped or variable bandwidth system.

In a rate damped servomechanism the amount of damping is determined by the amount of rate signal which is applied in the system as negative feedback. In the system of Fig. 1, for example, a tachometer 9 is driven by the shaft of motor 1 and is excited from a constant line voltage. The transfer function of block 9 is thus $(K_Ts)$ where $K_T$ is the tachometer constant and $s$ is the Laplacian operator. That is, the output $T_0$ of block 9 is equal to a constant $K_1$ times $dR/dt$, the rate of change of the reference input signal R with respect to time. In the system of Fig. 1 the signal $T_0$ may if desired be taken as an output of the system and is also applied through a block 10 (to be described in detail below) to a subtracting circuit 11 in which the output of block 10 is subtracted from the error signal. The output of the subtracting circuit 11 is then applied through amplifier 8 to drive motor 1.

In one form of prior art system a fixed portion of the output signal $T_0$ from a tachometer is directly applied to a subtracting device such as circuit 11. This results in what may be called a constant damping system. As shown by curve X in Fig. 4 the amount of damping that is to say, the damping factor as defined by Chestnut and Mayer, in such a system is constant no matter how large or how small the error signal may be. It follows that the bandwidth of such a system is also constant. The response time of such a system is shown by curve X of Fig. 5. The graph of Fig. 5 assumes that a step function or square wave input signal is applied as reference input signal R resulting in a relatively large error signal at time $t$ equals zero. Assuming that R thereafter remains constant the magnitude of the error signal is shown plotted as a function of time as the system responds to reduce the error signal in the manner discussed above. The horizontal dashed line at an error signal of one unit may be taken for purposes of comparison as a preestablished tolerance level within which the system must function. It will be noted from Fig. 5 that the constant damped system requires eleven units of time to reduce a ten unit error signal to the maximum allowable magnitude of one unit.

In another prior art system which has in the past been proposed, the amount of rate feedback is varied as an inverse linear function of the absolute magnitude of the error signal. Such a system may be achieved by driving both tachometer 9 and a second tachometer (not shown) from the shaft of motor 1. As in the system of Fig. 1, tachometer 9 is excited by a constant line voltage. The second tachometer, however, is excited by the error signal E and has its output combined in series opposition with, that is, subtracted from that of the first tachometer. Their combined output is then subtracted from the error signal E by a circuit such as subtracting circuit 11. The curve Y of Fig. 4 shows the resultant amount of damping plotted as ordinate against the magnitude of the error signal plotted as abscissa for such a system. The relationship may be termed linear inverse proportionality and results in a system response such as shown in curve Y of Fig. 5 which, as noted above, is a plot of error voltage as a function of time as the error voltage is reduced by the system. The linearly inverse damping type of system illustrated by curves Y of Figs. 4 and 5 is one form of variable damping or variable bandwidth system. It will be noted that this linearly inverse damping system reduces the ten unit error signal to the one unit level in about six units of time as against the eleven units of time required by the constant damping system. This is an improvement of transient or time response by a factor of nearly two to one.

In many applications, however, such as in gun fire control systems where a target must be rapidly, stably, and accurately acquired for tracking and computing purposes, it is of vital importance to improve even the response time shown in curve Y of Fig. 5 insofar as this can be accomplished with practicable instrumentation.

Such an improvement is achieved by the system of Figs. 1 and 2 as shown by the curves Z in Figs. 4 and 5 respectively.

In the system of Fig. 1 the block 10 through which the rate feedback signal $T_0$ is applied to subtracting circuit 11 consists of a remote cut-off pentode amplifier stage 20 to which the amplified error signal, $G_1E$, is applied through diode 21 as negative bias as shown in the circuit diagram of Fig. 2. It will be recalled that the signal $G_1E$ is an A.-C. modulated signal. Hence the diode 21 acts to apply the absolute magnitude of the signal as a negative bias of variable magnitude to the control grid (No. 1 grid) of pentode 22 across resistor 27 and capacitor 25. The rate signal $T_0$, which is the output of tachometer 9, is also applied to this control grid through a coupling capacitor 26 and across a resistor 27. Plate power is supplied to the tube 22 from a source of B+ power through load resistor 23, while screen grid bias is derived from B+ across resistor 28 which is by-passed to ground by a capacitor 29 in the usual manner. Output from the stage, which is the actual feedback signal $T_F$, is derived from the plate of pentode 22 and is applied as feedback input to subtracting circuit 11. The amplification or gain of the stage, that is to say, the ratio of $T_F$ to $T_0$, is of course determined by the bias applied to the tube in accordance with the tube characteristics in a manner which is well known in the art. Unlike the gains $G_1$, $G_2$, $G_3$ of amplifiers 6, 7, and 8, the gain or transfer function of amplifier 20 is not a constant but will vary as the bias signal varies.

A characteristic curve for a type 6BA6 tube, which may, for example, be used as pentode 22 of amplifier 20, is shown in Fig. 3. Curve V of Fig. 3 is a graph of the plate current of the tube as ordinate plotted against the voltage applied to the control or No. 1 grid of the tube as abscissa. The variation of the gain of amplifier 20 with varying bias depends upon the shape of the curve V of Fig. 3 as is well known in the art. It will be noted that if the grid bias voltage is considered as an independent variable, then the curve V of Fig. 3 is a very close approximation to a plot of the absolute magnitude of the reciprocal of this independent variable, that is to say, to the absolute magnitude of one divided by the independent variable. Therefore in Fig. 1 the transfer function of block 10, $T_F/T_0$, is indicated to be equal to a function of one divided by $G_1E$. $T_F$, as noted above, is the actual rate feedback signal taken across load resistor 23 from the plate of tube 22 and applied to subtracting circuit 11.

The tube or amplifier characteristic shown by curve V of Fig. 3 results in system damping of the type shown by curve Z in Fig. 4, which, as noted above, is a graph of the system damping factor plotted as ordinate against the magnitude of the system error signal plotted as abscissa. Of course, only the curve Z refers to the system illustrated in Figs. 1 and 2 which for convenience may be termed a reciprocally variably damped system as distinguished from the linearly inverse variably damped system of curve Y or the constant damping of curve X. As shown by the curve Z in Fig. 5, the response time or transient response of the system of Fig. 1 is improved over even that obtainable with linearly inverse variable damping by a factor of better than two to one.

That is to say, it will be noted from curve Z of Fig. 5 that an initial error signal of ten units is reduced to the acceptable one unit level indicated by the horizontal dashed line in about two and a half units of time whereas a linearly inverse variable damping system requires about six units of time and the constant damping system requires about eleven units of time. Curves Z indicate that in the system of Fig. 1, as the error signal is reduced to smaller and smaller values the damping is increased approximately in proportion to the absolute magnitude of the reciprocal of the error signal. The bandwidth of the system is thereby concomitantly decreased. The small damping and large bandwidth at large error signals permits a fast response. The large damping and small bandwidth at small error signals results in enhanced system stability and a high degree of discrimination against noise.

It should of course be understood that the curves Z of Figs. 4 and 5 have been termed illustrations of a reciprocally variably damped system merely for the sake of convience of terminology and because this is approximately the characteristic of the readily available pentode amplifier. In fact, of course, the greater the bow or curvature in the central portion of curves V and Z the faster the system will respond. Therefore the term reciprocally variably damped should be understood to refer to the damping characteristics obtainable from any remote cut-off amplifying device which will in general approximate a curve of the form $A/E^n$ where A is a constant selected to meet system requirements, E is the error voltage, and the exponent $n$ is a constant characteristic of the particular amplifying device used. For the system of Figs. 1 and 2 the value of $n$ is approximately one as shown by the graph of Fig. 4. For a system using a plurality of pentode stages rather than the single stage shown in Fig. 1 the value of $n$ could, of course, be varied to suit particular system needs. In the limit, of course, as its curvature or bowing increased the curve Z would become two perpendicular line segments, one vertical and one horizontal. Such a characteristic could be achieved by a relay but the abrupt break would introduce new transients and new problems of relay response time. It is, however, desirable to approach this characteristic as closely as possible with a simple, inexpensive, and smoothly responding remote cut-off amplifying device. The pentode amplifier shown in Fig. 2 is one illustrative embodiment of such a device.

It should also be understood that the details of the overall system of Fig. 1 are shown only by way of exemplary environment and may differ according to the intended application of the system. The linear amplifiers 6, 7, and 8, for example, may not all be needed or may be rearranged at will since they serve only to satisfy the practical power requirements of the motor. It will be obvious to those skilled in the art that the present concept of improving the servo response time consistently with other system requirements, such as stability and noise considerations, by using reciprocal variable damping can of course be applied by using a remote cut-off amplifying device in the feedback loop of any rate damped servomechanism in any desired overall system application regardless of whether the servomechanism uses electromechanical, electronic, pneumatic, hydraulic or any other convenient type of components. While a fire control system application has been suggested above for purposes of discussion it will of course be realized that many other system applications exist. The basic circuit concept of Fig. 1 could, for example, be used to control the potentiometer positioning motor of a servomultiplier unit of the type commonly used in general purpose analog computers.

While the principles of the invention have now been made clear, there will be immediately obvious to those skilled in the art many modifications in structure, arrangement, proportions, the elements and components used in the practice of the invention, and otherwise, which are particularly adapted for specific environments and operating requirements without departing from those principles. The appended claims are therefore intended to cover and embrace any such modifications within the limits of the true spirit and scope of the invention.

What I claim and desire to obtain by Letters Patent of the United States is:

1. In a rate damped servomechanism system of the type having means to derive a first controlled variable signal, a second reference input signal, means to subtract said first signal from said second signal to obtain their difference as a third error signal, and means to derive a fourth rate signal representative of the rate of change of said first controlled variable signal, the improvement comprising, a remote cut-off amplifying device the gain of which is a function of the reciprocal of the bias applied thereto, means to apply the absolute magnitude of said third error signal as bias to control the gain of said device, means to apply said fourth rate signal as an input to said device, means to substract the output of said device from said third error signal, and means to apply the output of said subtracting means as input to said means to derive said first controlled variable signal.

2. In a rate damped servomechanism system, means for deriving a first controlled variable signal; a second reference input signal; means to subtract said first signal from said second signal to obtain their difference as a third error signal; means to derive a fourth rate signal which is a modulated A.-C. signal the amplitude of which is proportional to the rate of change of said first controlled variable signal; a pentode amplifier having a remote cut-off characteristic, means to apply said fourth signal as an input to said amplifier, means to apply the absolute magnitude of said third error signal as a negative bias to said amplifier, the ouput of said amplifier being a fifth A.-C. damping signal; means to subtract said fifth signal from an A.-C. representation of said third signal to obtain their difference as a sixth A.-C. signal; means to apply said sixth A.-C. signal to said means for deriving said first controlled variable signal, the bandwidth of said system being an inverse function of the gain of said amplifying device, said gain being determined by the bias established by the magnitude of said third error signal.

References Cited in the file of this patent

UNITED STATES PATENTS

| | | |
|---|---|---|
| 2,692,358 | Wild | Oct. 19, 1954 |
| 2,760,131 | Braunagel | Aug. 21, 1956 |

OTHER REFERENCES

"Variable Damped Servomechanism," Electrical Engineering Magazine article, December 1956, page 1103.